(Model.)
T. DROHAN & T. PEARCE.
APPARATUS FOR SEPARATING MATTE FROM SLAG.
No. 496,823. Patented May 2, 1893.
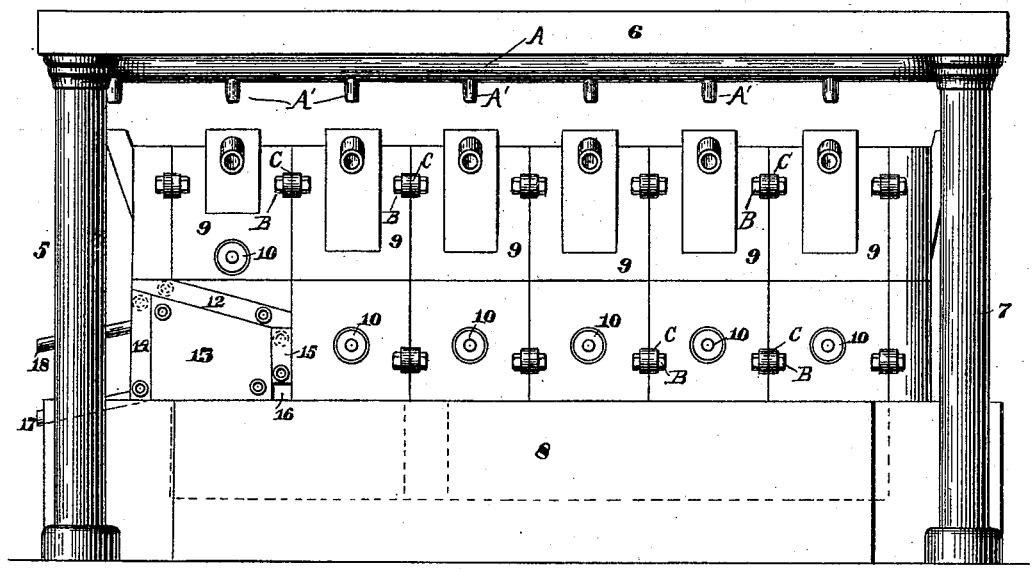
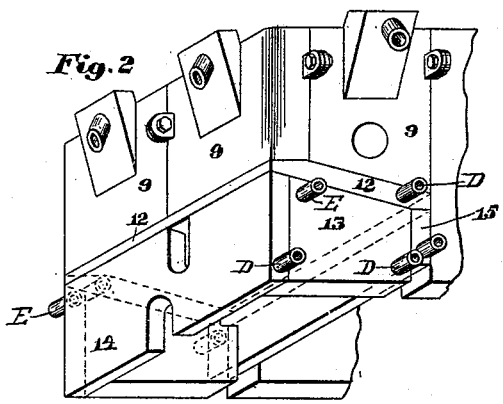
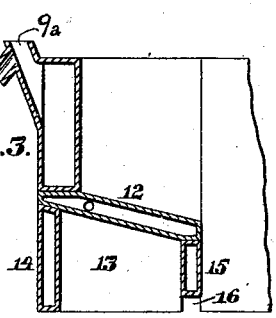
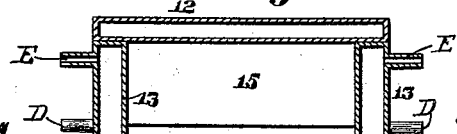
Witnesses: Inventors:
Thomas Drohan
Thomas Pearce

UNITED STATES PATENT OFFICE.

THOMAS DROHAN AND THOMAS PEARCE, OF DENVER, COLORADO.

APPARATUS FOR SEPARATING MATTE FROM SLAG.

SPECIFICATION forming part of Letters Patent No. 496,823, dated May 2, 1893.

Application filed July 26, 1892. Serial No. 441,344. (Model.)

*To all whom it may concern:*

Be it known that we, THOMAS DROHAN and THOMAS PEARCE, citizens of the United States of America, residing at Denver, in the county of Arapahoe and State of Colorado, have invented certain new and useful Improvements in Apparatus for Separating Matte from Slag; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an improved means for separating matte from slag in smelting furnaces and the object of the improvement is to effect a more nearly perfect separation of the matte from the slag than has heretofore been possible. At the present time the molten matte and slag are drawn off from the furnace into a pot in which the separation of the two is supposed to be effected by the settling of the matte to the bottom on account of its greater specific gravity, the lighter slag being draw off from the top of the pot. The objection to this method of separation is that the mass gradually cools or "freezes" since the pot or vessel in which the separation takes place is located in the open air, and though close to the furnace is not subjected to heat sufficient to prevent this "freezing," hardening, or solidifying of the mass whereby it becomes impossible to get a thorough separation. The result is that much valuable material is carried off to the dump as slag. We propose to overcome this difficulty by making provision for the separation of the matte from the slag within the furnace and before it has any chance to cool or partially solidify, which must necessarily result as soon as the mass leaves the furnace. To accomplish this object we locate a separating box across one end of the furnace, an opening being left in the rear and at the bottom of the box whereby the molten mass enters and remains in its original heated state and entirely protected from foreign disturbing influences. It is in this box that the separation takes place, the matte being drawn off from the bottom of the box and the slag from the top.

The invention will be fully understood by reference to the accompanying drawings, in which—

Figure 1 is a side elevation of a furnace showing the separating box in place. Fig. 2 is a fragmentary view in perspective showing the front part of the furnace in connection with the separating box. Fig. 3 is a vertical section of the box shown in connection with the furnace. Fig. 4 is a longitudinal section showing the separating box in detail.

Similar reference characters indicating corresponding parts or elements of the mechanism in the several views let the numeral 5 designate a furnace composed of the upper part 6, the lower part or retort 8 and the central part 7 provided with the water jackets 9 and tuyeres 10. The water jackets or bosh plates 9 are fed from a horizontal water-conduit A supported above the plates, and provided with an outlet A' for each plate or jacket. The plates 9 are secured together by means of bolts B passed through apertures or lugs C formed integral with the plates. The jackets are open as shown at $9^a$ in Fig. 3 to receive the water from the supply source. Across one end of the furnace is located the separating box composed of the inclined top or roof 12, ends 13, front side 14 and rear side or dam 15. All the parts of this box, that is, the roof, sides and ends must be water jacketed since they are subjected to the same degree of heat as the jackets 9 of which the main part of the furnace is composed. Water is introduced to each of these last named jackets through an inlet D at the bottom, or lower portion, and discharged from an outlet E at the top or upper portion. The jackets 9 at the end of the furnace where the separating box is located are made sufficiently short to make room for the box as shown. The rear side or dam 15 of the box may be vertically movable and is made sufficiently narrow to allow a passage way 16 beneath, through which the molten material may pass from the furnace to the box in which the separation takes place, the matte being drawn off from the bottom through a spout 17 and the slag from the top through a spout 18. The jackets of which the walls of the box are composed are provided with suitable inlet and outlet pipes through which the water is carried to and from the same in the same manner as in the case of the jackets 9 composing the body of the furnace. It will thus be seen that this box affords a retreat for the molten mass within the furnace whereby it is removed from all disturbing elements and the matte allowed to settle or separate from the slag, this separation being the most complete possible since there are no obstacles such as have been mentioned where the separating pot is located outside of the furnace.

Having thus described our invention, what we claim is—

1. The combination with a smelting furnace of a separating chamber located wholly within the furnace and surrounded by water jackets, this chamber being provided with an inlet for the molten mass from the furnace, and suitable outlets for the matte and slag after separation, substantially as described.

2. A smelting furnace provided with a separating box located in one end thereof and having walls formed of water jackets, provision being made at the bottom of the box for the entrance of the molten mass from the main chamber, the box being provided with suitable outlets for the matte and slag after separation, substantially as described.

3. A smelting furnace provided with a separating box or chamber confined wholly within the plane of the main chamber-walls, the walls of the separating chamber being formed of water jackets, provision being made for the entrance of the molten mass at the bottom of the separating chamber which is also provided with suitable outlets for the matte and slag, substantially as described.

4. A smelting furnace provided with a separating box located wholly within the planes of the main furnace walls, the walls of the box being formed of water jackets, the roof being downwardly inclined from the front to the rear side beneath which provision is made for the entrance of the molten mass from the main chamber, substantially as described.

In testimony whereof we affix our signatures in presence of two witnesses.

THOMAS DROHAN.
THOMAS PEARCE.

Witnesses:
WM. McCONNELL,
G. J. ROLLANDET.